United States Patent
Jordan et al.

(10) Patent No.: US 11,374,416 B2
(45) Date of Patent: *Jun. 28, 2022

(54) CHARGER ASSEMBLY AND CHARGING SYSTEM FOR AN ELECTRONIC VAPING DEVICE

(71) Applicant: Altria Client Services LLC, Richmond, VA (US)

(72) Inventors: Geoffrey Brandon Jordan, Midlothian, VA (US); Barry S. Smith, Hopewell, VA (US); Douglas A. Burton, Glen Allen, VA (US); Eric Hawes, Midlothian, VA (US); Sean Sundberg, Richmond, VA (US); Berina Yerkic-Husejnovic, Richmond, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/201,512

(22) Filed: Mar. 15, 2021

(65) Prior Publication Data

US 2021/0203174 A1    Jul. 1, 2021

Related U.S. Application Data

(60) Continuation of application No. 16/750,481, filed on Jan. 23, 2020, now Pat. No. 10,986,876, which is a
(Continued)

(51) Int. Cl.
*H02J 7/00* (2006.01)
*A24F 40/90* (2020.01)
*A24F 40/10* (2020.01)

(52) U.S. Cl.
CPC ............ *H02J 7/0044* (2013.01); *A24F 40/90* (2020.01); *H02J 7/00* (2013.01); *A24F 40/10* (2020.01)

(58) Field of Classification Search
CPC ............ H02J 7/0044; H02J 7/00; A24F 40/90
See application file for complete search history.

(56) References Cited

U.S. PATENT DOCUMENTS

| | | |
|---|---|---|
| D142,842 S | 11/1945 | Daze |
| D148,256 S | 12/1947 | Sovereign |

(Continued)

FOREIGN PATENT DOCUMENTS

| | | |
|---|---|---|
| CN | 201094280 | 8/2008 |
| CN | 101371721 A | 2/2009 |

(Continued)

OTHER PUBLICATIONS

<http://kelvin.en.made-in-china.com/productimage/FghEJNdCeOVw-2f1j00KeBtCALgEjYE/China-High-Quality-Triangular-Trimark-E-Cigarette.html>, copyright 2015, Focus Technology Co., Ltd.
(Continued)

*Primary Examiner* — Jean F Duverne
(74) *Attorney, Agent, or Firm* — Harness, Dickey & Pierce, P.L.C.

(57) ABSTRACT

A charger assembly is configured to charge the electronic vaping device. The charger assembly includes a base including a housing defining a port. The port is configured to receive a tip end of an electronic vaping device. The port includes a magnetic electrical contact centrally positioned at a bottom of the port and a first pin positioned at the bottom of the port. The charger assembly also includes a microprocessor electrically connected to the magnetic electrical contact and the first pin.

16 Claims, 4 Drawing Sheets

Related U.S. Application Data division of application No. 16/000,165, filed on Jun. 5, 2018, now Pat. No. 10,980,277, which is a continuation of application No. 15/190,584, filed on Jun. 23, 2016, now Pat. No. 10,010,114.

(60) Provisional application No. 62/184,559, filed on Jun. 25, 2015.

(56) References Cited

U.S. PATENT DOCUMENTS

| | | |
|---|---|---|
| 2,650,570 A | 9/1953 | Voelcker |
| D204,735 S | 5/1966 | Rogers |
| D205,754 S | 9/1966 | Hall |
| D210,732 S | 4/1968 | Anderson |
| D212,208 S | 9/1968 | Rogers |
| 3,587,573 A | 6/1971 | Flack |
| 3,681,018 A | 8/1972 | Karl-Georg et al. |
| D229,725 S | 12/1973 | Berger |
| D229,788 S | 1/1974 | Berger |
| D229,789 S | 1/1974 | Berger |
| D229,790 S | 1/1974 | Berger |
| D231,407 S | 4/1974 | Leedy |
| 4,193,411 A | 3/1980 | Faris et al. |
| D267,121 S | 11/1982 | Min |
| D291,126 S | 7/1987 | Gaptjern |
| 5,095,921 A | 3/1992 | Losee et al. |
| 5,179,966 A | 1/1993 | Losee et al. |
| 5,249,586 A | 10/1993 | Morgan et al. |
| 5,322,075 A | 6/1994 | Deevi et al. |
| 5,388,594 A | 2/1995 | Counts et al. |
| 5,591,368 A | 1/1997 | Fleischhauer et al. |
| 5,758,637 A | 6/1998 | Ivri et al. |
| D405,220 S | 2/1999 | Dal Monte |
| D409,563 S | 5/1999 | Haase et al. |
| 6,085,740 A | 7/2000 | Ivri et al. |
| D432,689 S | 10/2000 | Yuen |
| D436,998 S | 1/2001 | Brouwer et al. |
| D457,567 S | 5/2002 | Christianson |
| D460,971 S | 7/2002 | Sica et al. |
| 6,637,430 B1 | 10/2003 | Voges et al. |
| D489,679 S | 5/2004 | Wong |
| D520,446 S | 5/2006 | Liu et al. |
| D533,134 S | 12/2006 | Aglassinger |
| D534,682 S | 1/2007 | Malhi |
| D539,732 S | 4/2007 | Aglassinger |
| D548,880 S | 8/2007 | Leeds et al. |
| D555,085 S | 11/2007 | Kim |
| D563,314 S | 3/2008 | Kingston et al. |
| D621,347 S | 8/2010 | Aulwes et al. |
| D662,469 S | 6/2012 | Mulder et al. |
| 8,314,591 B2 | 11/2012 | Terry et al. |
| 8,511,318 B2 | 8/2013 | Hon |
| D692,613 S | 10/2013 | Morreale |
| D724,262 S | 3/2015 | Hearn et al. |
| D724,781 S | 3/2015 | Hearn et al. |
| D725,821 S | 3/2015 | Levin et al. |
| D728,154 S | 4/2015 | Lavanchy et al. |
| D729,439 S | 5/2015 | Scatterday |
| D730,571 S | 5/2015 | Chen |
| D742,021 S | 10/2015 | Labuschagne et al. |
| D744,419 S | 12/2015 | Bowen et al. |
| D749,509 S | 2/2016 | Blau |
| 10,010,114 B2 | 7/2018 | Jordan et al. |
| 10,986,876 B2 * | 4/2021 | Jordan .................. A24F 40/90 |
| 2009/0283103 A1 | 11/2009 | Nielsen et al. |
| 2010/0307518 A1 | 12/2010 | Wang |
| 2011/0209717 A1 | 9/2011 | Han |
| 2012/0199146 A1 | 8/2012 | Marangos |
| 2012/0227753 A1 | 9/2012 | Newton |
| 2013/0140200 A1 | 6/2013 | Scatterday |
| 2013/0169230 A1 | 7/2013 | Li et al. |
| 2013/0183852 A1 | 7/2013 | Rostami |
| 2013/0192623 A1 | 8/2013 | Tucker et al. |
| 2013/0300350 A1 | 11/2013 | Xiang |
| 2013/0327345 A1 | 12/2013 | Clarke |
| 2014/0007891 A1 | 1/2014 | Liu |
| 2014/0014124 A1 | 1/2014 | Glasberg et al. |
| 2014/0053857 A1 | 2/2014 | Liu |
| 2014/0104071 A1 | 4/2014 | Lo |
| 2014/0107815 A1 | 4/2014 | LaMothe |
| 2014/0224267 A1 | 8/2014 | Levitz et al. |
| 2015/0020831 A1 | 1/2015 | Weigensberg et al. |
| 2015/0027472 A1 | 1/2015 | Amir |
| 2015/0090278 A1 | 4/2015 | Schiff et al. |
| 2015/0208729 A1 | 7/2015 | Monsees |
| 2015/0245657 A1 | 9/2015 | Memari et al. |
| 2016/0286865 A1 | 10/2016 | King et al. |
| 2016/0353801 A1 | 12/2016 | Zinovik et al. |
| 2016/0360785 A1 | 12/2016 | Bless et al. |
| 2016/0374392 A1 | 12/2016 | Liu |
| 2017/0027226 A1 | 2/2017 | Mironov et al. |
| 2017/0095004 A1 | 4/2017 | Liu |
| 2017/0201108 A1 | 7/2017 | You et al. |
| 2017/0214261 A1 | 7/2017 | Gratton |

FOREIGN PATENT DOCUMENTS

| | | |
|---|---|---|
| CN | 203262285 | 11/2013 |
| CN | 203388261 | 1/2014 |

OTHER PUBLICATIONS

Non-Final Office Action dated Nov. 2, 2017 in U.S. Appl. No. 15/190,584.

Notice of Allowance dated Mar. 15, 2018 in U.S. Appl. No. 15/190,584.

U.S. Office Action for corresponding U.S. Appl. No. 16/750,481 dated May 29, 2020.

U.S. Office Action for corresponding U.S. Appl. No. 16/000,165 dated Jul. 9, 2020.

U.S. Office Action for corresponding U.S. Appl. No. 16/750,481 dated Nov. 13, 2020.

U.S. Notice of Allowance for corresponding U.S. Appl. No. 16/000,165 dated Jan. 4, 2021.

U.S. Notice of Allowance for corresponding U.S. Appl. No. 16/750,481 dated Feb. 23, 2021.

* cited by examiner

CHARGER ASSEMBLY AND CHARGING SYSTEM FOR AN ELECTRONIC VAPING DEVICE

CROSS-REFERENCE TO RELATED APPLICATIONS

This non-provisional patent application is a Continuation of U.S. application Ser. No. 16/750,481, filed on Jan. 23, 2020, which is a Divisional of U.S. application Ser. No. 16/000,165, filed on Jun. 5, 2018, which is a Continuation of U.S. application Ser. No. 15/190,584, filed on Jun. 23, 2016, which claims priority under 35 U.S.C. § 119(e) to provisional U.S. Application No. 62/184,559 filed on Jun. 25, 2015 in the United States Patent and Trademark Office, the entire contents of each of which are incorporated herein by reference.

BACKGROUND

Field

The present disclosure relates to a charger assembly and charging system for an electronic vaping or e-vaping device.

Description of Related Art

An e-vaping device includes a heater element which vaporizes a pre-vapor formulation to produce a "vapor." The e-vaping device includes a power supply, such as a battery, arranged in the device. The battery can be rechargeable. A charging device may recharge the battery of the e-vaping device.

SUMMARY

At least one example embodiment relates to a charger assembly configured to charge an electronic vaping device.

In an example embodiment, a charger assembly is configured to charge the electronic vaping device. The charger assembly includes a base including a housing defining a port. The port is configured to receive a tip end of an electronic vaping device. The port includes a magnetic electrical contact positioned at a bottom of the port and a first pin positioned at the bottom of the port. The charger assembly also includes a microprocessor electrically connected to the magnetic electrical contact and the first pin. The charger assembly may also include a second pin positioned at the bottom of the port.

In some example embodiments, the magnetic electrical contact is centrally positioned at the bottom of the port and the first pin and the second pin may be positioned peripheral to the magnetic electrical contact.

In at least one example embodiment, the port is generally triangular in cross-section and the base of the charger assembly is generally triangular in cross-section. The triangular cross-section of the port has a central port vertex and the triangular cross-section of the base has a central base vertex. The central port vertex is opposite from the central base vertex.

In some example embodiments, a bottom wall of the port is angled with respect to a longitudinal axis of the base and the central port vertex is at a highest point of the port. The base may also include a rechargeable power source configured to charge a battery of an electronic vaping device. In some example embodiments, the base may include a plastic outer shell.

In at least one example embodiment, a charging system for an electronic vaping device is provided. The charging system includes an electronic vaping device and a charger assembly. The charger assembly is configured to charge the electronic vaping device. The charger assembly includes a base including a housing defining a port. The port is configured to receive a tip end of an electronic vaping device. The port includes a magnetic electrical contact positioned at a bottom of the port. The magnetic electrical contact is configured to form a first electrical connection with the electronic vaping device. The port also includes a first pin positioned at the bottom of the port. The first pin is configured to form a second electrical connection with the electronic vaping device. The base also includes a microprocessor electrically connected to the magnetic electrical contact and the first pin. The charger assembly may include a second pin positioned at the bottom of the port.

In some example embodiments, the magnetic electrical contact is centrally positioned at the bottom of the port and the first pin and the second pin may be positioned peripheral to the magnetic electrical contact.

In some example embodiments, the first pin and the second pin are configured to be depressed upon insertion of the electronic vaping device in the port. The electronic vaping device includes a first electrical contact and a second electrical contact. The first electrical contact is centrally located on the tip end of the electronic vaping device. In at least one example embodiment, the first electrical contact is magnetic and the first electrical contact is configured to electrically connect with the magnetic electrical contact.

In some example embodiments, the second electrical contact is located on an outer edge of the tip end. The second electrical contact extends substantially about one of a circumference and a perimeter of the outer edge of the tip end. An insulating insert is positioned between the first electrical contact and the second electrical contact.

In at least one example embodiment, the tip end has a generally triangular cross-section. The port is generally triangular in cross-section and the base of the charger assembly is generally triangular in cross-section. In some example embodiments, the triangular cross-section of the port has a central port vertex and the triangular cross-section of the base has a central base vertex. The central port vertex may be opposite from the central base vertex. The port is angled with respect to a longitudinal axis of the base and the central port vertex is at a highest point of the port.

In some example embodiments, the base may also include a rechargeable power source configured to charge a battery of the electronic vaping device.

In at least one example embodiment, a charger assembly is provided. The charger assembly includes a base plate and a housing mated with the base plate. The housing has a top wall and at least one side wall. The housing has a generally triangular cross-section. The housing and the base plate define a chamber. A port may be defined by a bottom wall and at least one port side wall. The port extends from the top wall of the housing into the chamber. The bottom wall extends into the chamber at an angle. A central, magnetic electrical contact extends through the bottom wall of the port. A first pin extends through the bottom wall of the port. The charger assembly may also include a microprocessor electrically connected to the central, magnetic electrical contact and the first pin. In some example embodiments, the housing is generally frusto-pyramidal in shape.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
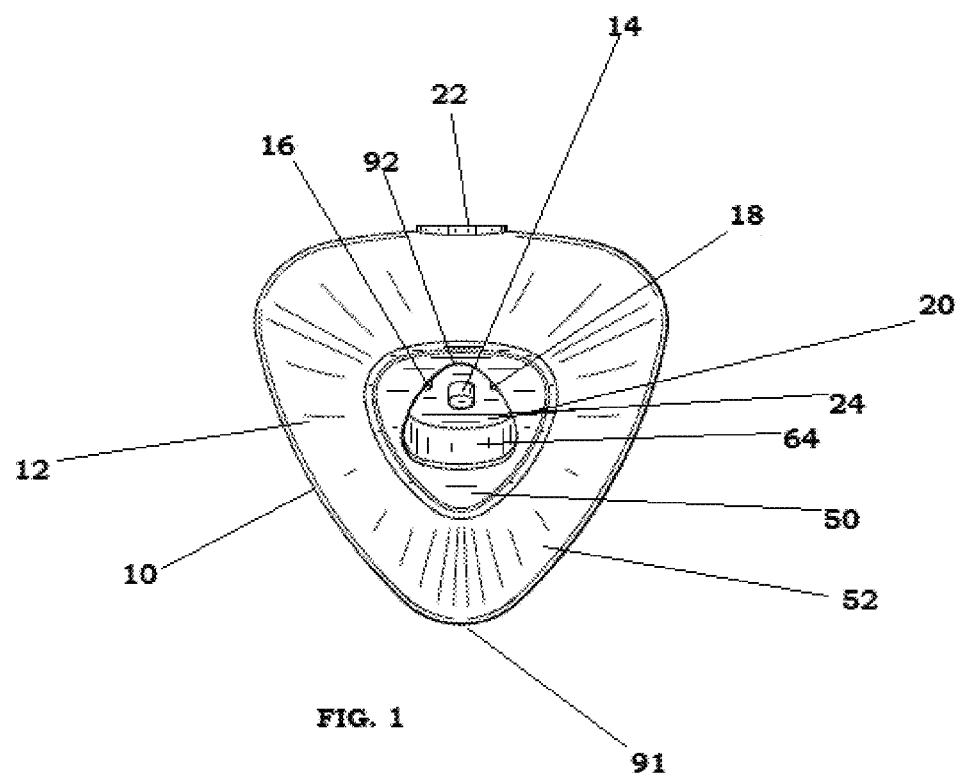
FIG. 1 is top view of a charger assembly according to an example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
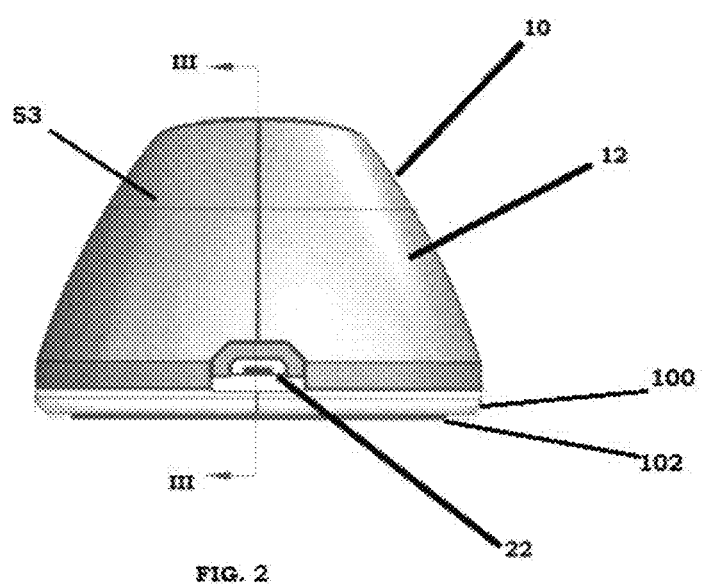
FIG. 2 is a back view of a charger assembly according to an example embodiment.
Figure 3:
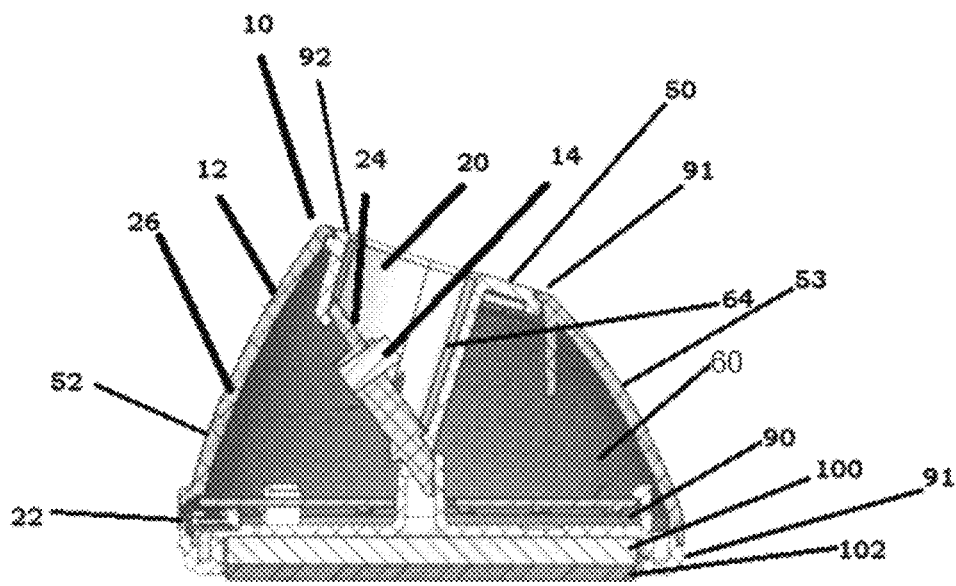
FIG. 3 is a cross-sectional view along line III-III of the charger assembly of FIG. 2.

Referring to FIGS. 1-3, a charger assembly 10 is configured to charge an e-vaping device 30 (shown in FIGS. 4-7). The charger assembly 10 includes a base 12. The base 12 includes a housing 53 that can be formed from one or more pieces of a material, such as a plastic or a metal. The housing 53 can include a top wall 50 and at least one side wall 52 that define an inner chamber 60 (shown in FIG. 3). The top wall 50 may be angled downwardly with respect to longitudinal axis of the housing 53. In some example embodiments, the housing 53 may be frusto-pyramidal in shape.

In some example embodiments, the base 12 can have a generally triangular cross-section with a central base vertex 91. The top wall 50 of the housing 53 angles downwardly towards the central base vertex 91.

In at least one example embodiment, a port 20 is formed in the top wall 50 of the housing 53. The port 20 is defined by a bottom wall 24 and at least one side wall 64. In an example embodiment, the port 20 has a generally triangular cross-section with a central port vertex 92. The bottom wall 24 is angled downwardly with respect to the longitudinal axis of the base 12, such that the central port vertex 92 is at a highest point of the bottom wall 24. In at least one example embodiment, the central port vertex 92 is opposite from the central base vertex 91. In some example embodiments, the bottom wall 24 is more steeply angled with relation to the longitudinal axis of the base 12 than the top wall 50 of the housing 53.

As shown in FIG. 2, in at least one example embodiment, a power connection port 22 is included in the base 12. The power connection port 22 can be a mini-USB port, a USB port, or any other suitable type of connection. The charger assembly 10 can be connected to a power source via the power connection port 22 to allow charging of an e-vaping device connected to the charger assembly 10 and/or to allow charging a battery contained in the charger assembly 10, if included.

FIG. 3 is a cross-sectional view of the charger assembly 10 along line III-III of FIG. 2 of an example embodiment. As shown, the base 12 includes the housing 53 mated with a base plate 100. Optionally, a rubber plate 102 can underlie the base plate 100 so as to mitigate scuffing and/or damaging of surfaces on which the charger assembly 10 is placed.

In at least one example embodiment, a microprocessor 90 may overlie the base plate 100 and is electrically connected to a magnetic contact 14, a first pin 16, and a second pin 18 (see FIG. 1). The microprocessor 90 is configured to initiate a charging cycle.

In some example embodiments, the magnetic contact 14 may be centrally located on the bottom wall 24 of the port 20. The first pin 16 and the second pin 18 may be pogo pins and/or may articulate up and down. In other example embodiments, the first pin 16 and the second pin 18 may be magnets and the contact 14 may be a pogo pin. For example, the first pin 16 and the second pin 18 may be spring biased upwardly, but articulate downward when depressed. One pin 16, 18 may be located on each side of the magnetic contact 14 and/or peripherally on the bottom wall 24. The magnetic contact 14 is electrically connected to the microprocessor 90, and magnetically attracts a magnetic contact on an e-vaping device so as to form a first electrical connection therewith and align a tip end of the e-vaping device within the port 20 for charging. The magnetic contact 14 can be formed of magnetic stainless steel or any other suitable material that provides good conduction and is magnetic.

In at least one example embodiment, the first pin 16 and the second pin 18 are electrically connected to the microprocessor 90 (not shown). For example, wires may electrically connect the first pin 16 and the second pin 18 to the microprocessor 90.

One of the first pin 16 and the second pin 18 is configured to form a second electrical connection with an e-vaping device. The other one of the first pin 16 and the second pin 18 is configured to indicate to the microprocessor 90 that an e-vaping device has been inserted in the port 20 for charging so as to initiate a charging cycle.

Upon insertion of an e-vaping device in the port 20, the first pin 16 and the second pin 18 are depressed, and the magnetic contact 14 and the port 20 align and secure the e-vaping device in the port 20.

Figure 4:
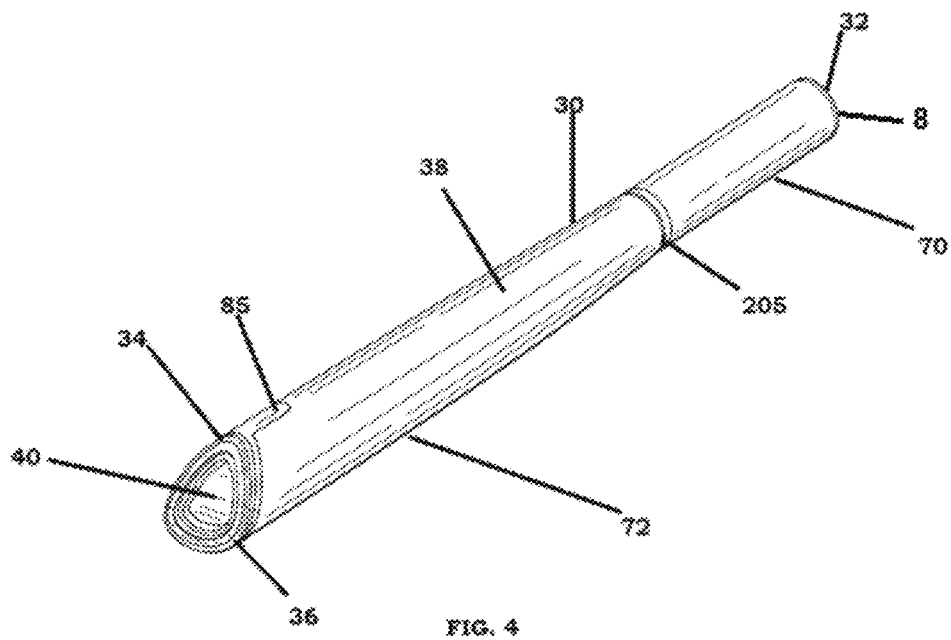
FIG. 4 is a perspective view of an electronic vaping device according to at least one example embodiment.

As shown in FIG. 4, in at least one example embodiment, an e-vaping device 30 includes a tip end 34 that can be inserted in the port 20 of the charger assembly 10.

The e-vaping device 30 may include a replaceable cartridge (or first section) 70 and a reusable battery section (or second section) 72, which may be coupled together at a threaded connector 205. It should be appreciated that the connector 205 may be any type of connector, such as a snug-fit, detent, clamp, bayonet, and/or clasp. Upon completing the connection between the first section 70 and the second section 72, the battery 1 may be electrically connectable with the heater of the first section 70 upon actuation of the sensor.

In some example embodiments, the first section 70 may include a reservoir configured to contain a pre-vapor formulation and a heater that may vaporize the pre-vapor formulation, which may be drawn from the reservoir by a wick. The first section 70 may include an outer housing 38 extending in a longitudinal direction and an inner tube (or chimney) coaxially positioned within the outer housing 38 as described in U.S. Patent Application Publication No. 2013/0192623 to Tucker et al. filed Jan. 31, 2013, the entire content of which is incorporated herein by reference thereto.

As shown in FIG. 4, a mouth-end insert 8 can be positioned at a mouth-end 32 of the first section 70. The mouth-end insert 8 includes at least two outlets, which may be located off-axis from the longitudinal axis of the e-vaping device 30. The outlets may be angled outwardly in relation to the longitudinal axis of the e-vaping device 30. The outlets may be substantially uniformly distributed about the perimeter of the mouth-end insert 8 so as to substantially uniformly distribute vapor as the vapor exits the e-vaping device 30.

In some example embodiments, the outer housing 38 extends along a length of the e-vaping device 30. The outer housing 38 can have a generally cylindrical cross-section and a diameter of the outer housing 38 can be substantially the same along the length of the e-vaping device 30.

In some example embodiments, the outer housing 38 along one or more of the first section 70 and the second section 72 can have a triangular or polygonal cross-section and dimensions of the outer housing 38 can vary along the length of the e-vaping device 30.

The outer housing 38 can be formed of one or more of plastic or metal. If the outer housing 38 is formed of plastic, the plastic can include a sputtered metal coating. Moreover, indicia can be printed at one or more locations along the length of the outer housing 38.

In at least one example embodiment, the second section 72 may include a sensor (not shown), a battery 1, and a microprocessor 96. The microprocessor 96 may be configured to initiate heating cycles.

In some example embodiments, the tip end 34 of the e-vaping device 30 may be angled and the tip end 34 can have a generally triangular cross-section. A base of the triangular cross-section can be at a point of the angled tip end 34.

Figure 6:
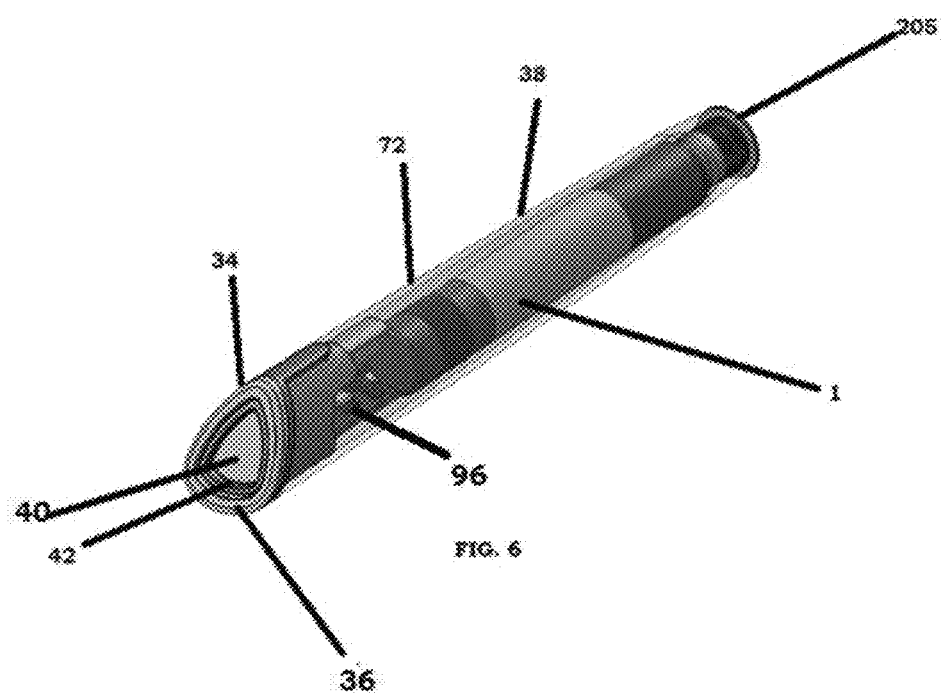
FIG. 6 is a perspective view of a second section of an electronic vaping device drawn with a transparent housing according to at least one example embodiment.
Figure 7:
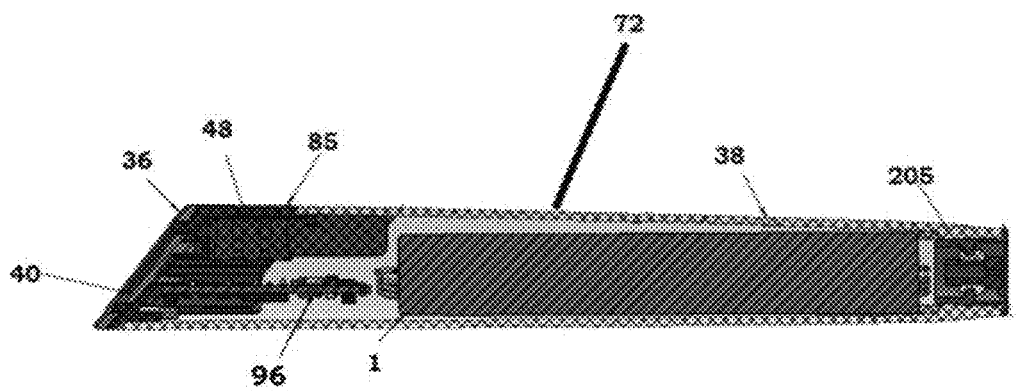
FIG. 7 is a cross-sectional view of an electronic vaping device along line VII-VII of FIG. 5 according to an example embodiment.

In at least one example embodiment, the second section 72, shown in FIGS. 6 and 7, includes the power supply 1. The power supply 1 may include a battery. The battery may be a Lithium-ion battery or one of its variants, for example a Lithium-ion polymer battery. Alternatively, the power supply 1 may be a nickel-metal hydride battery, a nickel cadmium battery, a lithium-manganese battery, a lithium-cobalt battery or a fuel cell. The e-vaping device 30 may be usable by an adult vaper until the energy in the power supply 1 is depleted or in the case of lithium polymer battery, a minimum voltage cut-off level is achieved.

The power supply 1 may be rechargeable and may include circuitry configured to allow the battery to be chargeable by the charger assembly 10. The charger assembly may include a rechargeable power source configured to charge a battery of the e-vaping device.

In at least one example embodiment, the e-vaping device 30 may include an indicator 85 and a heater activation light 48 configured to glow when the heater is activated. The indicator 85 can be substantially translucent, such that the heater activation light 48 can be seen through the end cap if desired. For example, the indicator 85 and the activation light 48 may include at least one LED and at least one light pipe on a lateral surface near the tip end 34 of the e-vaping device 30.

The heater activation light 48 may include an LED and may extend along a side of the outer housing 38. Moreover, the heater activation light 48 may be arranged to be visible to an adult vaper during vaping. In addition, the heater activation light 48 may be utilized for e-vaping system diagnostics or to indicate that recharging is in progress. The heater activation light 48 may also be configured such that the adult vaper may activate and/or deactivate the heater activation light 48 for privacy.

Figure 5:
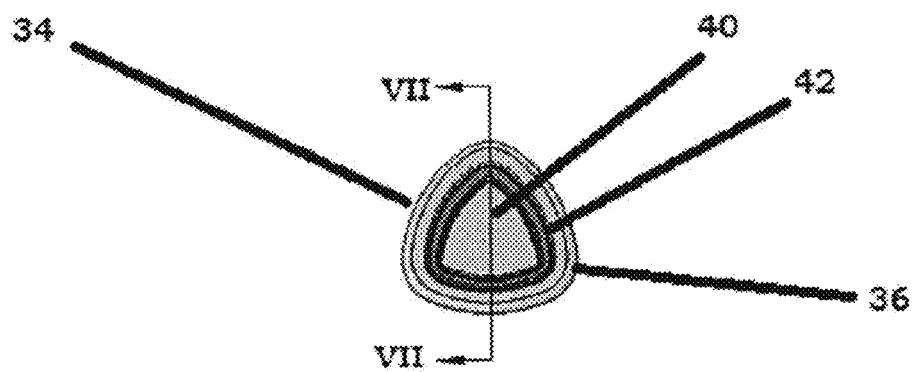
FIG. 5 is a planar view of a tip end of an electronic vaping device according to at least one example embodiment.

In at least one example embodiment, as shown in FIGS. 5-6, the e-vaping device 30 may include a first electrical contact 40 located at a central portion of the tip end 34 of the e-vaping device and a second electrical contact 36 extending around at least a portion of an outer perimeter of the tip end 34 of the e-vaping device. An insulating insert 42 may be positioned between the first electrical contact 40 and the second electrical contact 36. The first electrical contact 40 and the second electrical contact 36 may be connected to the battery 1.

In at least one example embodiment, the first electrical contact 40 is generally triangular in shape and formed of a magnetic material, such as magnetic stainless steel. Other suitable conductive and magnetic materials may also be used to form the first electrical contact 40 if desired. The stainless steel may be silver plated. In at least one example embodiment, the first electrical contact 40 may be colored and/or textured. For example, the first electrical contact 40 may be formed of a mesh material so as to allow air flow into the device, if desired.

In an example embodiment, the second electrical contact 36 is formed of a conductive material, such as stainless steel. The stainless steel may be silver plated.

Because the first electrical contact 40 and the second electrical contact 36 are at the tip end 34 of the e-vaping device 30, the e-vaping device 30 need not be dismantled in order to initiate charging of the power supply 1.

Instead, the tip end 34 of the e-vaping device can be inserted in the port 20 of the charger assembly 10 when fully assembled. Once inserted, the magnetic contact 14 of the charger assembly 10 will be magnetically attracted to the first electrical contact 40 of the e-vaping device 30, such that the first electrical contact 40 and the magnetic contact 14 are brought into contact, an electrical connection is formed, and the e-vaping device 30 is aligned and secured within the port 20 without being locked into place. One of the first pin 16 and the second pin 18 will then form an electrical connection with the second electrical contact 36 of the e-vaping device 30. A remaining one of the first pin 16 and the second pin 18 will be depressed upon insertion of the tip end 34 into the port 20 and will indicate to the microprocessor 90 of the charger assembly 10 that the e-vaping device has formed an electrical connection with the charger assembly 10 due to sensing of a resistance or a lack thereof and/or a change in resistance. The microprocessor 90 then initiates a charging cycle.

In at least one example embodiment, the charger assembly 10 is configured to validate that the e-vaping device 30 is compatible with the charger assembly 10. At least one of the first pin 16 and the second pin 18 may transmit information between the charger assembly 10 and the e-vaping device 30 regarding battery health, software versions and/or updates, and the like.

In an example embodiment, the e-vaping device 30 may be about 80 mm to about 110 mm long and about 7 mm to about 8 mm in diameter. For example, in one example embodiment, the e-vaping device may be about 84 mm long and may have a diameter of about 7.8 mm.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. A charger assembly configured to charge an electronic device configured to generate a vapor, the charger assembly comprising:
   a housing defining a port corresponding to a shape of the electronic device, the port configured to receive a tip end of the electronic device, the port including,
   a magnetic contact positioned at a bottom of the port to form a first direct connection with the tip end of the electronic device, the first direct connection being a magnetic connection between the magnetic contact and the tip end of the electronic device,
   a first pogo pin positioned at the bottom of the port to form a second direct connection with the tip end of the electronic device, the second direct connection being an electrical connection,
   a second pogo pin positioned at the bottom of the port, the magnetic contact, the first pogo pin and the second pogo pin being separated by a bottom wall of the port, and
   a microprocessor electrically connected to the first pogo pin and the second pogo pin.

2. The charger assembly of claim 1, wherein the magnetic contact is configured to attract a magnetic portion of the electronic device.

3. The charger assembly of claim 2, wherein the first pogo pin and the second pogo pin are peripherally positioned on the bottom of the port.

4. The charger assembly of claim 1, wherein the first pogo pin is on a first side of the magnetic contact.

5. The charger assembly of claim 4, wherein the second pogo pin is on a second side of the magnetic contact.

6. The charger assembly of claim 1, wherein the housing further comprises:
   a rechargeable power source configured to charge a battery of the electronic device.

7. The charger assembly of claim 1, wherein the housing further comprises:
   a plastic outer shell.

8. The charger assembly of claim 1, wherein the housing further comprises:
   a connection port configured to connect the housing with an external power supply.

9. A charging system for an electronic device configured to generate a vapor, the charging system comprising:
   the electronic device; and
   a charger assembly configured to charge the electronic device, the charger assembly including,
   a housing defining a port corresponding to a shape of the electronic device, the port configured to receive a tip end of the electronic device, the port including, a magnetic contact positioned at a bottom of the port to form a first direct connection with the electronic device, the first direct connection being a magnetic connection between the magnetic contact and the tip end of the electronic device; and a first pogo pin positioned at the bottom of the port to form a second direct connection with the tip end of the electronic device, the second direct connection being an electrical connection; and a second pogo pin positioned at the bottom of the port, the magnetic contact, the first pogo pin and the second pogo pin being separated by a bottom wall of the port, and a microprocessor electrically connected to the first pogo pin and the second pogo pin.

10. The charging system of claim 9, wherein the magnetic contact is configured to attract a magnetic portion of the electronic device.

11. The charger assembly of claim 10, wherein the first pogo pin and the second pogo pin are peripherally positioned on the bottom of the port.

12. The charging system of claim 10, wherein the first pogo pin and the second pogo pin are configured to be depressed upon insertion of the electronic device in the port.

13. The charging system of claim 9, wherein the electronic device includes a first electrical contact.

14. The charging system of claim 13, wherein the first electrical contact is centrally located on the tip end of the electronic device.

15. The charging system of claim 14, wherein the first electrical contact is magnetic.

16. The charging system of claim 9, wherein the housing further comprises:

a rechargeable power source configured to charge a battery of the electronic device.

* * * * *